US008954402B2

(12) United States Patent
Tsuboi et al.

(10) Patent No.: US 8,954,402 B2
(45) Date of Patent: Feb. 10, 2015

(54) CHARACTER STRING GENERATION METHOD, ARTICLE OF MANUFACTURE AND SYSTEM

(75) Inventors: Yuta Tsuboi, Kanagawa-ken (JP); Yuya Unno, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 13/185,579

(22) Filed: Jul. 19, 2011

(65) Prior Publication Data

US 2012/0036149 A1   Feb. 9, 2012

(30) Foreign Application Priority Data

Aug. 6, 2010   (JP) .................. 2010-177996

(51) Int. Cl.
*G06F 7/00* (2006.01)
*G06F 17/00* (2006.01)
*G06F 17/30* (2006.01)

(52) U.S. Cl.
CPC ............... *G06F 17/30696* (2013.01)
USPC .......................................... 707/693; 707/694

(58) Field of Classification Search
None
See application file for complete search history.

(56) References Cited

U.S. PATENT DOCUMENTS

| 7,269,548 | B2 * | 9/2007 | Fux et al. ............... 707/999.007 |
| 2003/0140022 | A1 * | 7/2003 | Miller et al. ................ 706/19 |
| 2009/0077076 | A1 * | 3/2009 | Berger et al. ................ 707/6 |
| 2010/0293464 | A1 * | 11/2010 | Harada et al. ............... 715/716 |
| 2012/0166182 | A1 * | 6/2012 | Ko et al. ..................... 707/722 |

FOREIGN PATENT DOCUMENTS

| JP | 2004-164133 | 6/2004 |
| JP | 2004-164133 A | 6/2004 |
| JP | 2004-164133 | 10/2004 |
| JP | 2005-222263 | 8/2005 |
| JP | 2005-222263 A | 8/2005 |

(Continued)

OTHER PUBLICATIONS

M. Yamamoto et al., "KIWI: A Multilingual Usage Consultation Tool based on Internet Searching", Annual Meeting of the Association for Natural Language Processing, 2005.

(Continued)

*Primary Examiner* — Fred I Ehichioya
*Assistant Examiner* — Jua-Shya Meng
(74) *Attorney, Agent, or Firm* — F. Chau & Associates, LLC

(57) ABSTRACT

A method, article of manufacture, and system for enabling context surrounding a search result to be displayed succinctly. The method includes searching a document set configured as a frequency ordered suffix tree to obtain a frequency ordered context tree. Applying dynamic programming to the frequency ordered context tree to retrieve a set (C) of context strings (c) having n1 elements of context strings (c). Defining an area covered by a character string (s) in the entire set of context strings C $\{c_1, \ldots, c_{n1}\}$ as the product of (1) the number (n2) of context strings (c) having s as a prefix and (2) the length of character string (s). Obtaining a set of character strings (S) that maximizes the sum of areas. In addition, dynamic programming can include a pruning process such that if an upper limit does not reach a maximum value, the search in progress is abandoned.

20 Claims, 11 Drawing Sheets

(56) References Cited

FOREIGN PATENT DOCUMENTS

| JP | 2007-213157 | 8/2007 |
|---|---|---|
| JP | 2007-213157 A | 8/2007 |

OTHER PUBLICATIONS

T. Kasai et al., "Linear-Time Longest-Common-Prefix Computation in Suffix Arrays and Its Applications," Proceedings of 12th Annual Symposium on Combinatorial Pattern Matching, pp. 181-192, 2001.
G. Nong et al., "Two Efficient Algorithms for Linear Suffix Array construction", IEEE Transactions on Computers, 2008.
Kumiko Ishii et al, Multi-lingual Dynamic KWIC based on Internet Search, IPSJ SIG Technical Report, Nov. 13, 2002, vol. 2002, No. 104, p. 115-121.
Minoru Yoshida et al, Mining Numbers In Text Using Suffix Arrays and Clustering Based on Dirichlet Process Mixture Models, IPSJ SIG Technical Report, Dec. 15, 2009, H21(4) CD-ROM.
Kumiko Nakata et al, "Multi Lingual Dynamic KWIC based on Internet Search" IPSJ SIG Technical Report, Information Processing Society of Japan, vol. 2002 No. 104,p. 115-121, publication date: Nov. 13, 2002.
Minoru Yoshida et al., "Mining Number in Text Using Suffix Arrays and Clusterring Based on Dirichlet Process Mixture Models" IPSJ SIG Technical Report, 2009 No. 4 [CD-ROM] Information Processing Society of Japan,p. 1-8, publication date: Dec. 15, 2009.

* cited by examiner (a)

(b)

CONVENTIONAL TECHNIQUE

「データベース」

```
22: データベース (データベース名)
21: データベース：database
14: データベース、ビュー、またはフォ
14: データベースに対するアクセス権を
28: データベースへのマッピング・ファ
53: データベースまたはディレクトリー
17: データベース・エラーが発生しまし
10: データベース・クローラー
51: データベース・マッピング・ファイ
14: データベース名
```

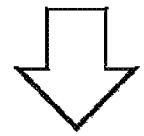

TECHNIQUE OF INVENTION

```
70: データベース・クローラー
71: データベース・サーバー
51: データベース・マッピング・ファイ
46: データベースのクロール
29: データベースにエクスポート
40: データベースをクロールする
22: データベース (データベース名)
28: データベースへの・マッピング・ファ
53: データベースまたはディレクトリー
21: データベース：database
```

Figure 12

CHARACTER STRING GENERATION METHOD, ARTICLE OF MANUFACTURE AND SYSTEM

CROSS-REFERENCE TO RELATED APPLICATIONS

This application claims priority under 35 U.S.C. §119 from Japanese Patent Application No. 2010-177996 filed Aug. 6, 2010, the entire contents of which are incorporated herein by reference.

BACKGROUND OF THE INVENTION

1. Field of the Invention

The present invention relates to a technique for searching for a character string in natural language text and, in particular, to a technique for displaying a search result appropriately and succinctly by using dynamic programming applied to a frequency-ordered context tree.

2. Description of Related Art

In a search for a character string in text, context strings surrounding a hit provide useful information. For example, a document or set of documents can be searched for a character string such as "button." When the search finds the character string, it's deemed a 'hit'. However, words surrounding the hit "button" may also be useful and should be displayed. The words surrounding the hit are the context strings. For example, if a search finds the word "button" in a document, context strings such as "is clicked" or "is pressed" which follow "button" can also be displayed. In this way a document can be checked for consistency of wording on the basis of which of the context strings follows button. In another application, the document and character string can also be checked whether or not a definitive article is given to a particular English proper noun. Information about context strings surrounding a hit is also important in other searches such as collocation and person name searches.

A conventional technique, KWIC (KeyWord In Context), is known in which character strings surrounding a search term are sorted and displayed.

For example, all context strings displayed when "ボタン" (button) is searched for using KWIC may be as follows:

ボタンが大きくて ...
ボタンが赤い ...
ボタンという表
ボタンに書いてあ ...
ボタンをクリックしたら ...
ボタンをクリックして下 ...
ボタンをクリックしよう ...
ボタンをクリック できな ...
ボタンをクリック できま ...
ボタンをクリック
ボタンを押したら ...
ボタンを押しては ...
ボタンを押せませ ...
ボタンを押そうと ...

However, KWIC has a drawback in that the entire trend cannot be seen at a glance if too many hits are found.

A technique disclosed in Masato Yamamoto, Kumiko Tanaka, Hiroshi Nakagawa, "KIWI: A Multilingual Usage Consultation Tool based on Internet Searching", Annual Meeting of The Association for Natural Language Processing, 2005, and Published Unexamined Patent Application No. 2004-164133 proposes an extended KWIC method that enables measurement of the levels of importance of context strings to be displayed. However, the extended method still has a drawback in that an optimum combination of multiple context strings cannot be selected and a large number of similar pieces of text are displayed.

SUMMARY OF THE INVENTION

Therefore, it is an object of the present invention to provide a technique for enabling context strings surrounding a search result to be appropriately brought together in a limited range and displayed.

In one aspect of the present invention, a document or set of documents is searched on the basis of a keyword character string ("s") which retrieves a set ("C") of context strings ("c"). An area covered by a character string "s" in an entire set of context strings "C" $\{c_1, \ldots, c_n\}$ is defined by the product of the number of elements "c" having "s" as a prefix and the length of "s". A set of character strings is obtained the maximizes the sum of the area under the condition that the maximum number character strings displayed is less than or equal to K where K is an integer greater than or equal to 1.

According to another aspect of the present invention, dynamic programming on a frequency-ordered context tree can be used. A frequency ordered context tree is a trie of the entire context.

According to another aspect of the present invention, when the maximum area is determined by the dynamic programming, an upper limit area that can be obtained by a search is estimated to enable substantial pruning of the search, thereby speeding up the process.

Furthermore, child nodes in a suffix tree of a document are arranged in the order of frequency of occurrences to build a frequency-ordered suffix tree, thereby enabling faster searching and determination of the maximum area.

The process described above can be naturally applied not only to succeeding context but also to preceding context. Furthermore, the process is applicable to analysis of data in any language such as English and event strings with time because word separation is not used.

The present invention provides a technique for compressing and displaying search results so that as much information as possible is provided in a limited region. In addition, computation required for the technique can be accelerated by using dynamic programming.

BRIEF DESCRIPTION OF THE DRAWINGS

FIG. 12 is a diagram illustrating comparison between context display according to a typical conventional technique and context display according to a technique of an embodiment of the present invention.

DETAILED DESCRIPTION OF THE PREFERRED EMBODIMENTS

Figure 1:
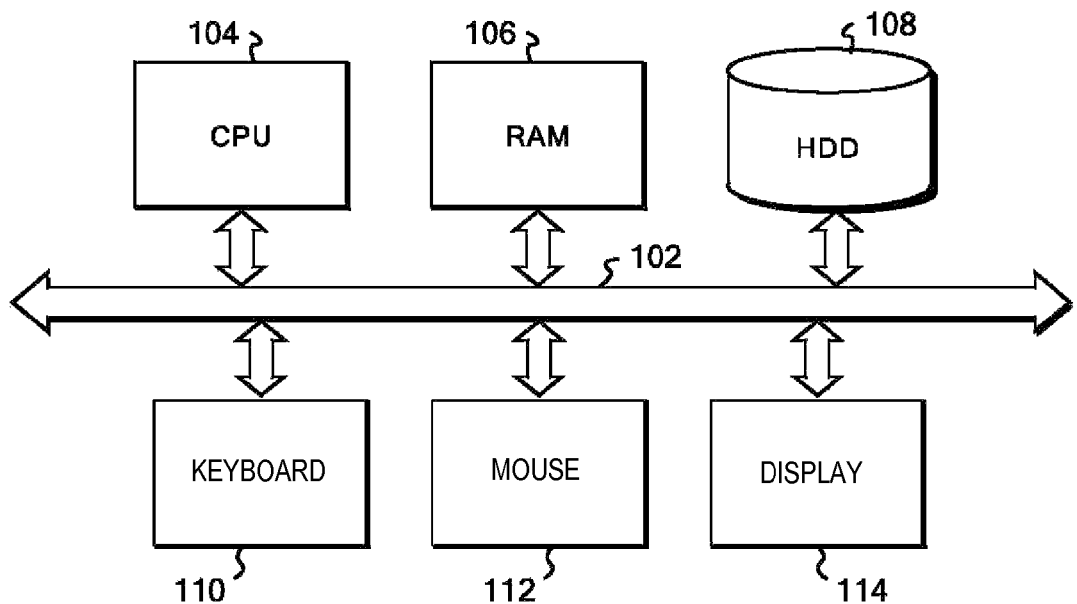
FIG. 1 is a block diagram of a hardware configuration for carrying out the present invention according to an embodiment.

An Embodiment of the present invention will be described with respect to the drawings. Like reference numerals denote like objects throughout the drawings unless otherwise stated. It should be understood that the following is a description of exemplary embodiments of the present invention and is not intended to limit the present invention to the specifics described with respect to the embodiment.

The basic principle of the invention is to apply dynamic programming to a frequency-ordered context tree to obtain a set of character strings which maximize the area in which a set of character strings covers a set of context strings. Detailed description of the invention is made in combination with the following embodiments.

Referring to FIG. 1, a block diagram of computer hardware for implementing a system configuration and processing according to one embodiment of the present invention is illustrated. In FIG. 1, a CPU 104, a main memory (RAM) 106, a hard disk drive (HDD) 108, a keyboard 110, a mouse 112, and a display 114 are connected onto a system bus 102. The CPU 104 is preferably based on a 32-bit or 64-bit architecture and may be Pentium™ 4, Core™ 2, Duo, or Xeon™ from Intel Corporation, or Athlon™ from Advanced Micro Devices, Inc. The main memory 106 has preferably a capacity of 2 GB or more. The hard disk drive 108 is preferably has a capacity of 320 GB or more so that a large amount of text data and frequency-ordered suffix tree data for searching can be stored.

Although not specifically depicted, an operating system is pre-stored in the hard disk drive 108. The operating system may be any operating system that is compatible with the CPU 104, such as Linux™, Windows™ 7, Windows XP™, or Windows™ 2000 from Microsoft Corporation, or Mac OS™ from Apple Computer, Inc.

Further stored in the hard disk drive 108 are text data to be searched, a frequency-ordered suffix tree generation module which generates frequency-ordered suffix tree data from the text data, frequency-ordered suffix tree data generated by the frequency-ordered suffix tree generation module, a character string search module which finds context strings using a technique of the present invention on the basis of a keyword specified by a user and outputs the strings in compressed display form, and a GUI module for displaying the strings output from the character string search module on the display 114. These data and modules will be described later in further detail with reference to a functional block diagram in FIG. 2.

The keyboard 110 and the mouse 112 are used for activating an operating system or a program (not depicted) loaded from the hard disk drive 108 into the main memory 106 and displayed on the display 114 and for entering characters to be searched for.

The display 114 is preferably a liquid-crystal display, which may have any resolution such as XGA (1024×768 resolution) or UXGA (1600×1200 resolution), for example.

Figure 2:
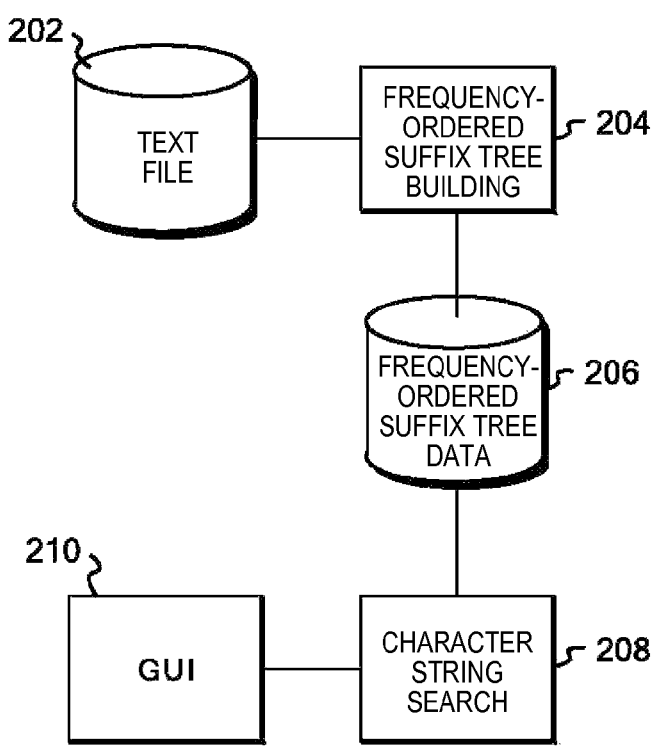
FIG. 2 is a block diagram of a functional configuration for carrying out the present invention according to an embodiment.

Functional elements for processing of the present invention will be described with reference to the functional block diagram in FIG. 2. A text file 202 is a bulk file stored in the hard disk drive 108 and preferably contains natural language text data.

The frequency-ordered suffix tree building module 204 reads out the text file 202 and stores it as a frequency-ordered suffix tree data 206 in the hard disk drive 108. A process performed by the frequency-ordered suffix tree building module 204 will be described later in further detail with reference to a flowchart in FIG. 3.

The character string search module 208 includes a function relating to processing that is a subject matter of the present invention. The character string search module 208 searches for context strings on the basis of a keyword input by a user and calculates and provides compressed display character strings based on the context strings. A process performed by the character string search module 208 will be described later in further detail with reference to flowcharts in FIG. 6 and subsequent figures.

The GUI module 210 has the function of providing a character string input by the user using the keyboard 110 and the mouse 112 to the character string search module 208 and displaying context strings output from the character string search module 208 on the display 114.

The frequency-ordered suffix tree building module 204, the character string search module 208, and the GUI module 210 can be written in an existing programming language such as C, C++, C#, or Java™. The GUI module 210 is preferably programmed to call API functions provided by the operating system to read user-input character strings or to display output context strings on the display 114.

A process performed by the frequency-ordered suffix tree building module 204 for generating and outputting frequency-ordered suffix tree data will be described with reference to the flowchart in FIG. 3.

A frequency-ordered suffix tree is a trie constructed for all suffixes in a document. The all suffixes are a set of character strings at and subsequent to every position in a document. Accordingly, a document with a length "n" has "n" suffixes. Child nodes of each node of the trie are sorted in descending order of the total number of leaves. A conventional suffix tree is generated by sorting nodes alphabetically, rather than in order of total number of leaves. The size of the frequency-ordered suffix tree is "O(n)" which is the same as the size of a suffix tree and is "2n" nodes at the maximum.

Figure 3:
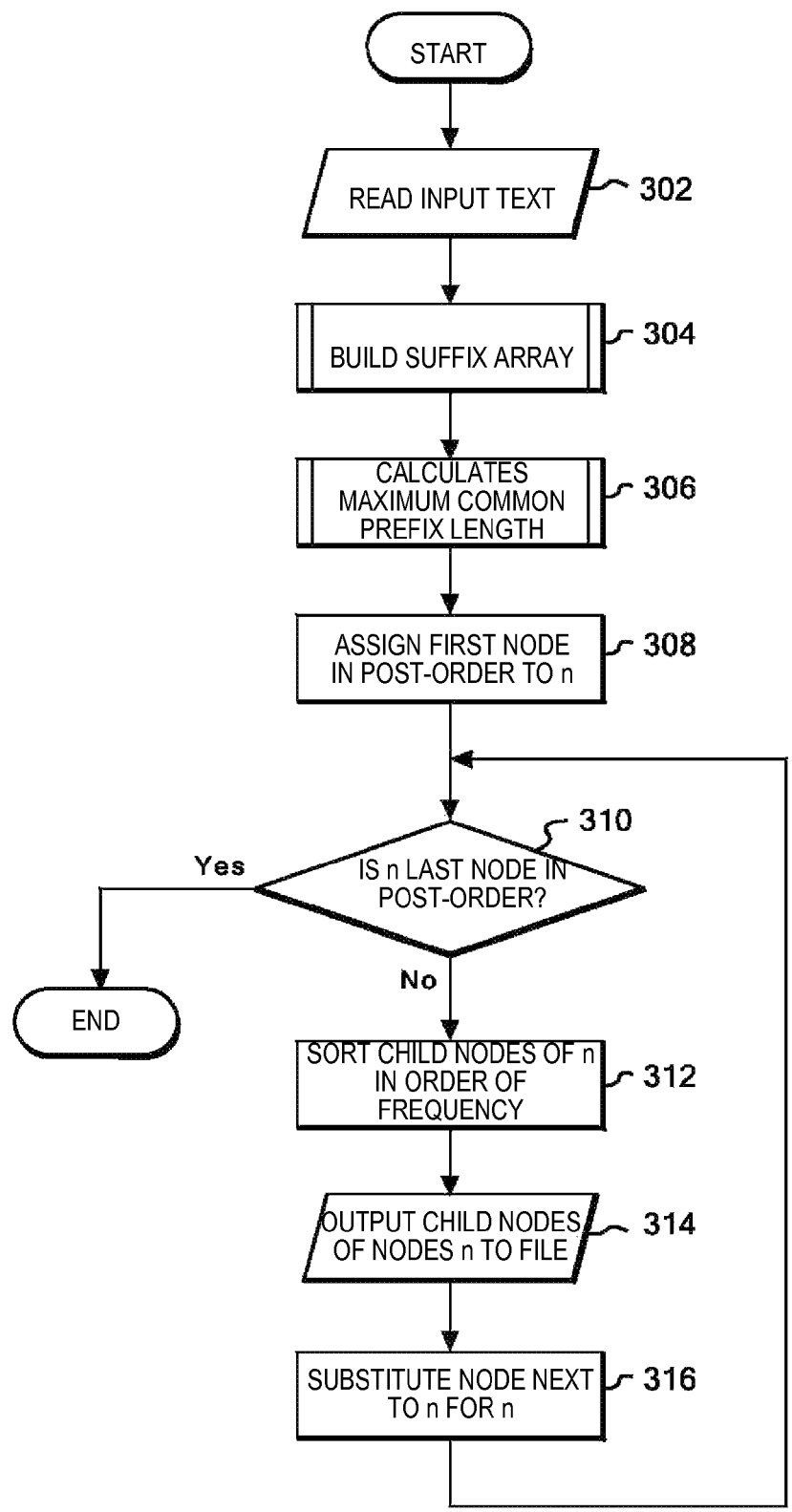
FIG. 3 illustrates a flowchart of a process for building a frequency-ordered suffix tree according to an embodiment of the present invention.

The frequency-ordered suffix tree building module 204 reads the text file 202 at step 302 of FIG. 3 and builds a suffix array at step 304. The process may be performed using for example a technique described in Ge Nong, Sen Zhang, Wai Hong Chan, "Two Efficient Algorithms for Linear Suffix Array construction", IEEE Transactions on Computers, 2008.

At step 306, the frequency-ordered suffix tree building module 204 calculates the maximum prefix length. For example, the technique described in the following document can be used for the process. Toru Kasai, Gunho Lee, Hiroki Arimura, Setsuo Arikawa, and Kunsoo Park: Linear-Time Longest-Common-Prefix Computation in Suffix Arrays and Its Applications, In Proceedings of 12th Annual Symposium on Combinatorial Pattern Matching, pp. 181-192, 2001.

At step 308, the frequency-ordered suffix tree building module 204 assigns the first node in post-order to "n". Post-order traversal in a suffix array is described for example in Toru Kasai, Gunho Lee, Hiroki Arimura, Setsuo Arikawa, and Kunsoo Park: Linear-Time Longest-Common-Prefix Computation in Suffix Arrays and Its Applications, In Proceedings of 12th Annual Symposium on Combinatorial Pattern Matching, pp. 181-192, 2001.

At step 310, the frequency-ordered suffix tree building module 204 determines whether "n" is the last node in post-order; if so, the frequency-ordered suffix tree building module 204 ends the process.

Otherwise, the frequency-ordered suffix tree building module 204 proceeds to step 312, where the frequency-ordered suffix tree building module 204 sorts the child nodes of "n" in the order of frequency. At step 314, the frequency-ordered suffix tree building module 204 outputs the child nodes of "n" to a file, which is stored in the hard disk drive 108 as frequency-ordered suffix tree data 206.

At step 316, a node next to "n" is substituted for "n" and then the process returns to the determination at step 310.

Figure 4:
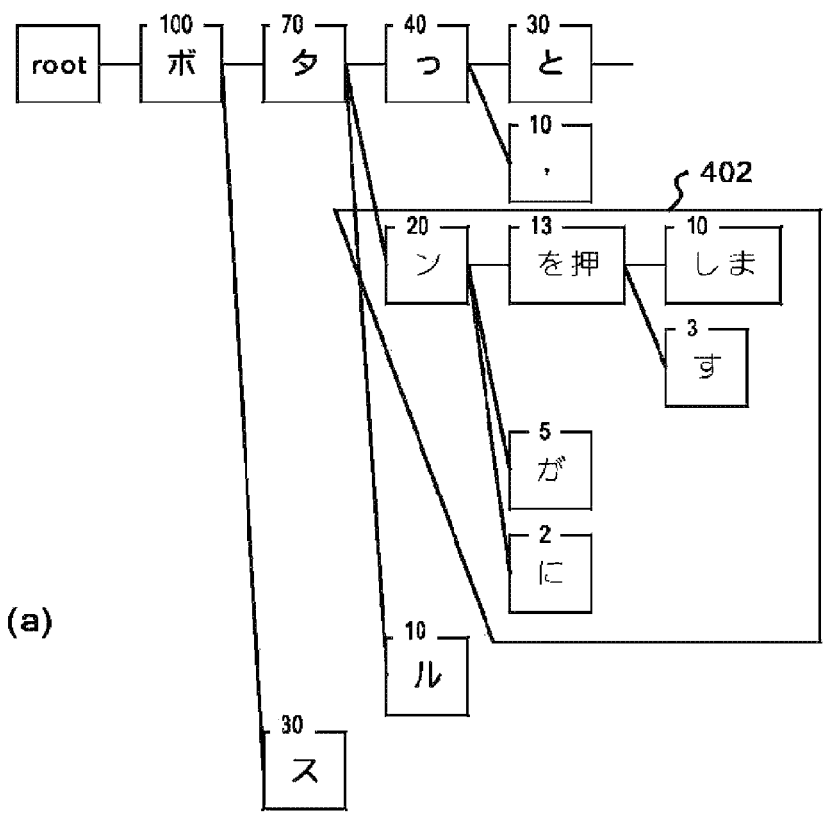
FIG. 4 is a diagram illustrating an exemplary frequency-ordered suffix tree and an exemplary frequency-ordered context tree according to an embodiment of the present invention.
Figure 4:
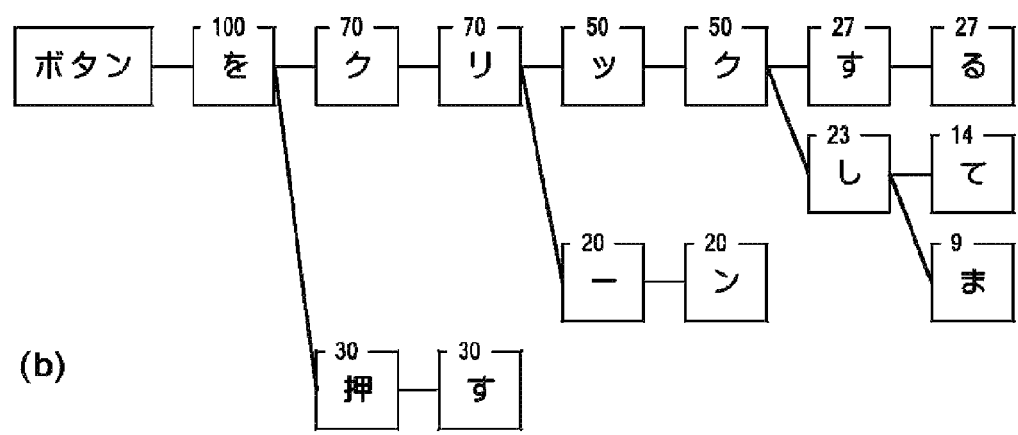

FIG. 4(a) illustrates a tree structure of an exemplary frequency-ordered suffix tree thus built. In FIG. 4, characters such as "ボ" and "タ" are nodes of the frequency-ordered suffix tree and the number appearing above each node indicates the number of occurrences. The region labeled with reference numeral 402 in particular in FIG. 4 represents the frequency-ordered context tree for "ボタン". Once a frequency-ordered suffix tree is built for a given text file to be searched and is stored in the hard disk drive 108, the frequency-ordered suffix tree can be reused for searching any number of times without rebuilding unless the text file is changed.

FIG. 4(b) illustrates an exemplary frequency-ordered context tree. The frequency-ordered context tree is dynamically generated on the main memory or the hard disk drive 108 by searching the frequency-ordered suffix tree with a particular keyword. Dynamic programming of the present invention, which will be described later, is performed on a frequency-ordered context tree dynamically generated in this way.

A search on the frequency-ordered suffix tree can be performed in a way similar to that on a suffix tree, except that the search on the frequency-ordered context tree needs to be linear because child nodes are not alphabetically arranged. Here, child nodes are arranged in sequence in the data structure, so that the search can be accomplished by making random access a number of times proportional to a query length. A sub-tree rooted at a node found at the end of the search will be a frequency-ordered context tree.

Figure 5:
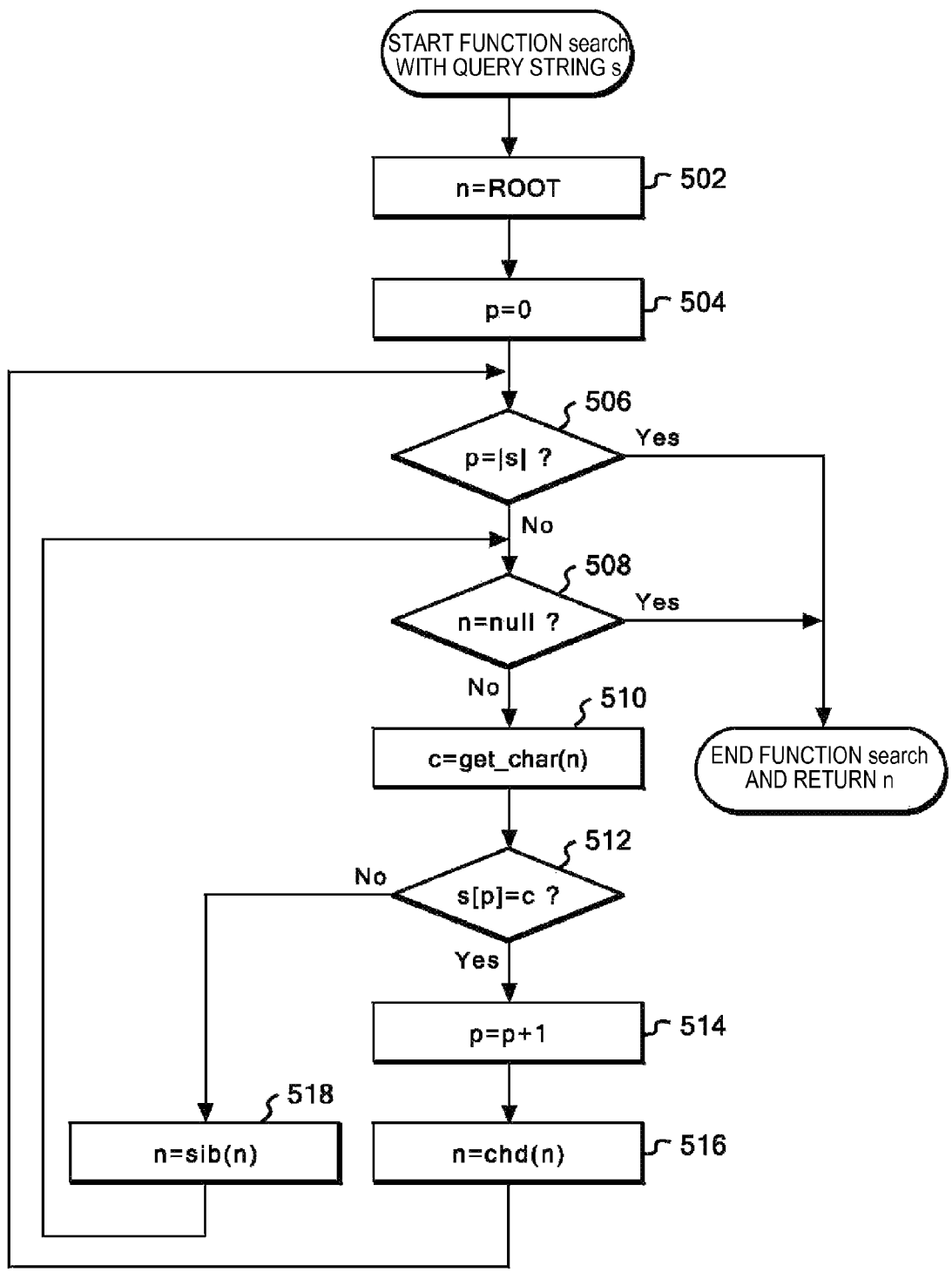
FIG. 5 is a diagram illustrating a process for searching for frequency-ordered suffix tree data according to an embodiment of the present invention.

FIG. 5 illustrates a process for searching the frequency-ordered suffix tree data 206 built as a result of the process in FIG. 3. The process is preferably implemented as search( ) which is one of the functions as subroutines of the character string search module 208.

In the flowchart of the function "search" in FIG. 5, "s" denotes a query string. At step 502, a root node ("ROOT") is substituted for "n". At step 504, p, an integer, is set to p=0. At step 506, determination is made as to whether or not p=|s|, where |s| is the length of "s". If p=|s|, the function "search" returns "n" and then ends.

If "p" is not equal to |s|, the process proceeds to step 508, where determination is made as to whether or not n=null. If n=null, the function "search" returns "n" and then ends.

If "n" is not null, the process proceeds step 510, where c=get_char(n) is executed. Here, get_char(n) returns a character for node "n".

At step 512, determination is made as to whether or not s[p]=c. Here, s[p] is the p-th character in the character string "s". If s[p]=c, p is incremented, p=p+1, at step 514 and chd (n), which is the first child node of "n", is substituted for "n" by n=chd(n) at step 516. Then the process returns to step 506.

If s[p] is not equal to "c" at step 512, the next sibling node sib(n) of "n" is substituted for "n" by n=sib(n) at step 518. Then the process returns to step 508. After execution of search(s), a sub-tree of the frequency-ordered suffix tree that is rooted at a return value "n" is built on the main memory 106 or the hard disk drive 108 as a frequency-ordered context tree as illustrated in FIG. 4(b).

Figure 6:
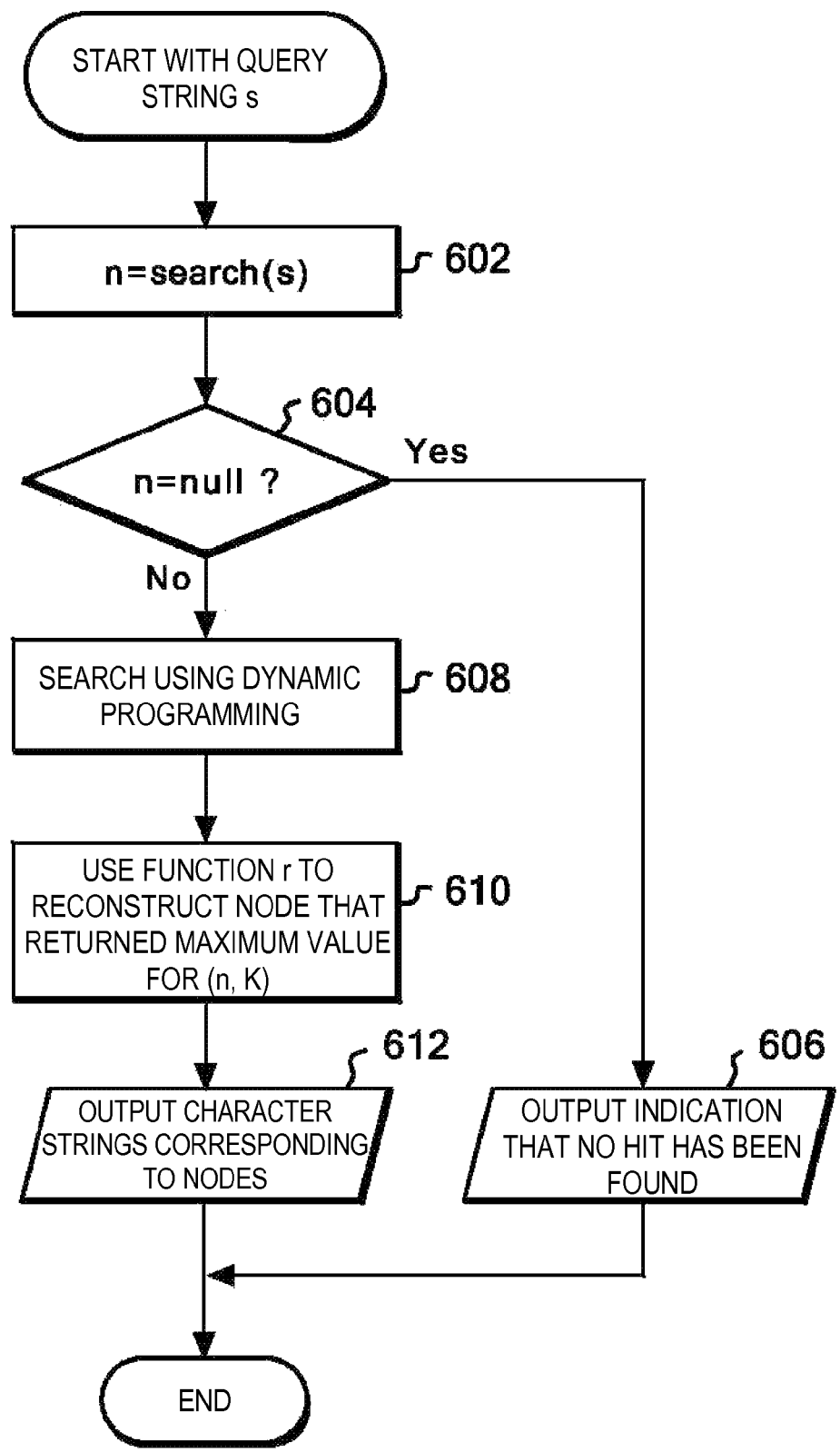
FIG. 6 illustrates a flowchart of a search and an entire process for searching for an optimum context according to an embodiment of the present invention.

FIG. 6 illustrates a flowchart of a search and an entire process for searching for an optimum context, performed by the character string search module 208.

The character string search module 208 calls the function "search(s)" illustrated in the flowchart of FIG. 5 and returns the result to "n" at step 602. Here, "s" is a query string input by the user through the GUI module 210.

The character string search module 208 determines whether "n" is a null at step 604 and, if so, outputs an indication that no hit has been found at step 606, then ends the process. The character string search module 208 does this by providing a message to the GUI module 210 to allow the GUI module 210 to display the message on the display 114.

If the character string search module 208 determines at step 604 that "n" is not null, the character string search module 208 performs a search process using dynamic programming at step 608. In this embodiment, the character string search module 208 may have a function, f(n, K) of dynamic programming, which will be described later with respect to a flowchart in FIG. 7, and/or a function g(n, K, 0) of dynamic programming with pruning, which will be described later with respect to a flowchart in FIG. 9, as a subroutine or subroutines. Here, "K" is the maximum number of character strings that are selected. In this step, the dynamic programming is applied to the frequency-ordered context tree built by search(s) at step 602.

The function g(n, K, 0), which involves a pruning process, is better suited than the function f(n, k) for a search of a large frequency-ordered context tree because of a process with pruning. Accordingly, the character string search module 208 may use g(n, K, 0) if the frequency-ordered context tree is larger than a predetermined size; otherwise, the character string search module 208 may use f(n, K).

After execution of one of f(n, K) and g(n, K, 0) at step 608, the character sting search module 208 uses a function, "r", to reconstruct the node that returned the maximum value for (n, K) at step 610. The process of the function "r" will be described later in detail with reference to a flowchart in FIG. 10.

Once character strings corresponding to the nodes have been obtained in this way, the character string search module 208 provides the character strings to the GUI module 210 to allow the GUI module 210 to display the character strings on the display 114 at step 612.

A process of the dynamic programming of the present invention will be described below. Before describing the process, the terms "area" and "area maximization" in the present invention will be defined first.

It is assumed here that a compression of context strings is displayed in a display region of "K" lines and "L" characters at the maximum. Let $C=\{c_1, \ldots, c_{n1}\}$ be a set of n1 context strings and $S=\{s_1, \ldots, s_m\}$ be a set of n1 character strings. Here, m≤K, len(s)≤L, and len(s) is the length of a character string "s".

It is also assumed that a given character string in the set "S" is not a prefix of another character string. The assumption is made in order to prevent similar substrings such as "を" and "を使う" and "を使うとき" from appearing.

Therefore, the area A(S,C) in which "S" covers "C" is defined by the following equation:

$$A(S, C) = \sum_{s \in S} CP(s, C) * len(s) \quad \text{[Expression 1]}$$

Here, CP(s,C) returns the number (n2) of elements in "C" whose prefix is a string "s" and len(s) returns the length of "s".

What is to be obtained here is "S" that maximizes the area for a given "C", that is, argmax s A(S, C).

However, typically there are a huge number of candidates for "S". Therefore, dynamic programming is used to efficiently calculates S in the present invention.

Figure 7:
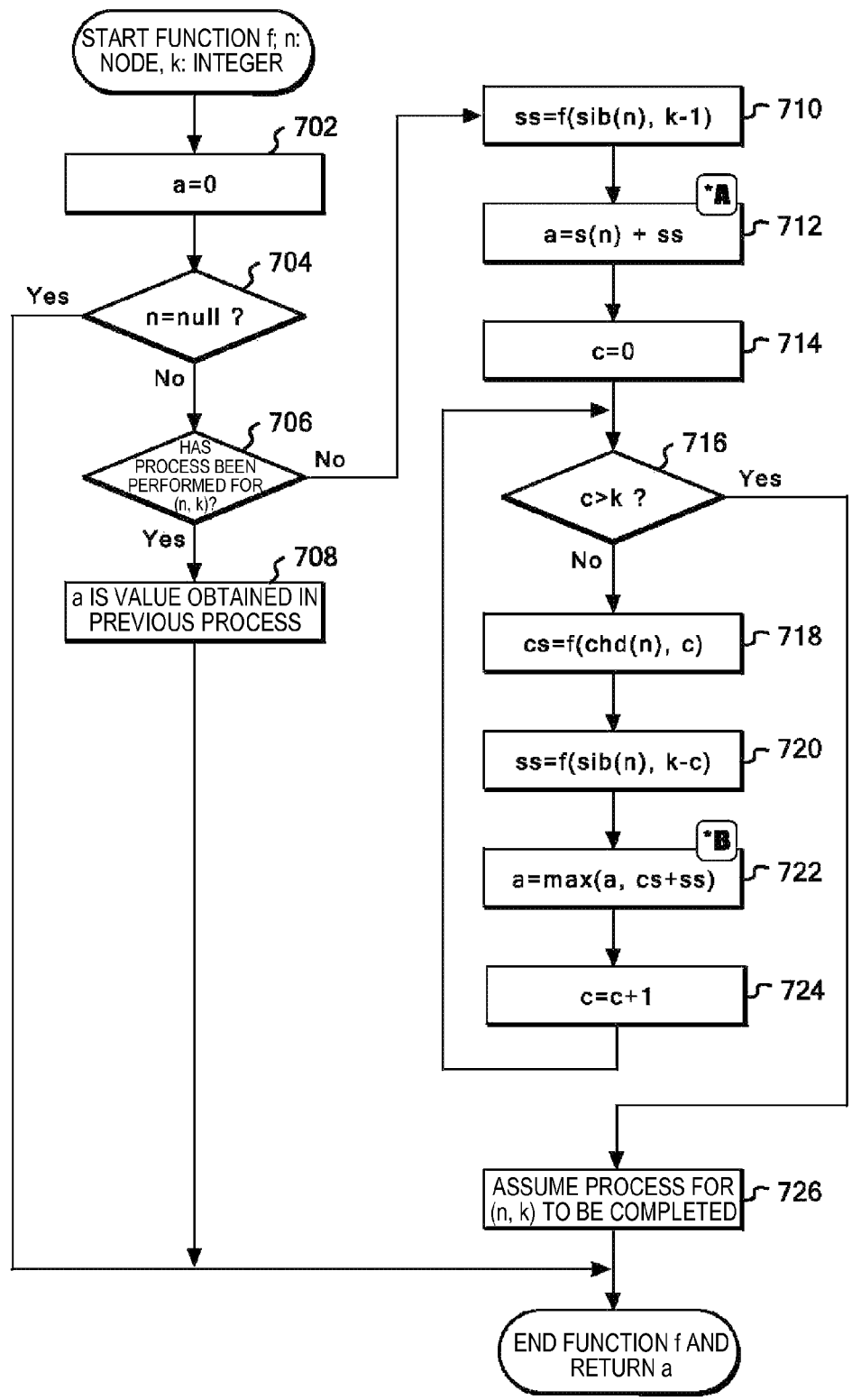
FIG. 7 illustrates a flowchart of a search process using dynamic programming according to an embodiment of the present invention.

Under the definitions given above, a process of f(n, k) will be described with reference to the flowchart of FIG. 7. Here, f(n, k) is a function that returns the maximum area that can be obtained when the maximum number "k" of nodes are selected from among a node "n" and its child nodes and sibling nodes.

For a variable "a", a=0 is set at step 702. Determination is made at step 704 as to whether or not n=null. If n=null, the function f( ) returns "a" and then ends.

If "n" is not null, the process proceeds to step 706, where determination is made as to whether or not the process has been completed for (n, k). If completed, the function f( ) returns the value "a" obtained in the previous process for (n, k) at step 708 and then ends.

If the process for (n, k) has not been performed yet, f( ) is recursively called by ss=f(sib(n), k−1) and the return value is substituted for "ss" at step 710. Here, sib(n) is the next sibling node of "n".

At step 712, the value calculated by a=s(n)+ss is substituted for "a". Here, s(n) is the area covered by node "n", defined above. The result of the calculation at step 712 is denoted by *A.

At step 714, c=0 is set, then the sequence from step 716 to 714 is repeated while incrementing "c" by 1, until it is determined at step 716 that c>k.

Specifically, at step 718, a value calculated by cs=f(chd(n), c) is substituted for "cs", where chd(n) is the first child node of node "n".

At step 720, a value calculated by ss=f(sib(n), k−c) is substituted for "ss".

At step 722, a value calculated by a=max(a, cs+ss) is substituted for "a". The result of the calculation at step 722 is denoted by *B.

At step 724, "c" is incremented as c=c+1. Then the process returns to the determination at step 716. The loop is repeated until c>k at step 716, then the process for (n, k) is assumed to be completed at step 726. The function f( ) returns "a" and then ends.

A process of the function g(n, k, m) of dynamic programming with pruning will be described with reference to the flowcharts of FIGS. 8 and 9. The function "f" described with respect to FIG. 7 searches for a combination that provides the maximum value. The function "g" provides a maximum value in a search in progress and, if it is found that the maximum value cannot be reached even if the rest of the process is continued, the function "g" can discontinue the process. To this end, an upper limit of a true maximum value is estimated and, when the upper limit is found not to exceed a maximum value in a search in progress, the search is aborted. For efficient pruning, the true maximum value needs to be found as early as possible and the upper value that is as close to the true maximum value as possible needs to be calculated efficiently.

Preferably, the values of "c" for the functions should be evaluated in ascending order because empirically an optimum value is likely to be provided when "c" is small.

The upper limit u(n, k) may be any function that returns a value greater than or equal to the true maximum value f(n, k). For example, heuristics may be used in which a value when the length of "k" sibling nodes of a node, including that node, has reached the maximum length or an upper limit calculated when "k", k+1, . . . , whichever the smallest, is set as the upper limit. Here, whether or not the upper limit of the true maximum value has been reached can be determined because the child nodes are arranged in order of frequency of occurrences. Furthermore, high efficiency can be achieved because the computational complexity does not depend on the number of hits.

Based on these assumptions, the process of the function g(n, k, m) of the dynamic programming with pruning is configured.

At step 802, a=0 is set for the variable "a". At step 804, determination is made as to whether n=null. If n=null, the function g( ) returns "a" and then ends.

Figure 8:
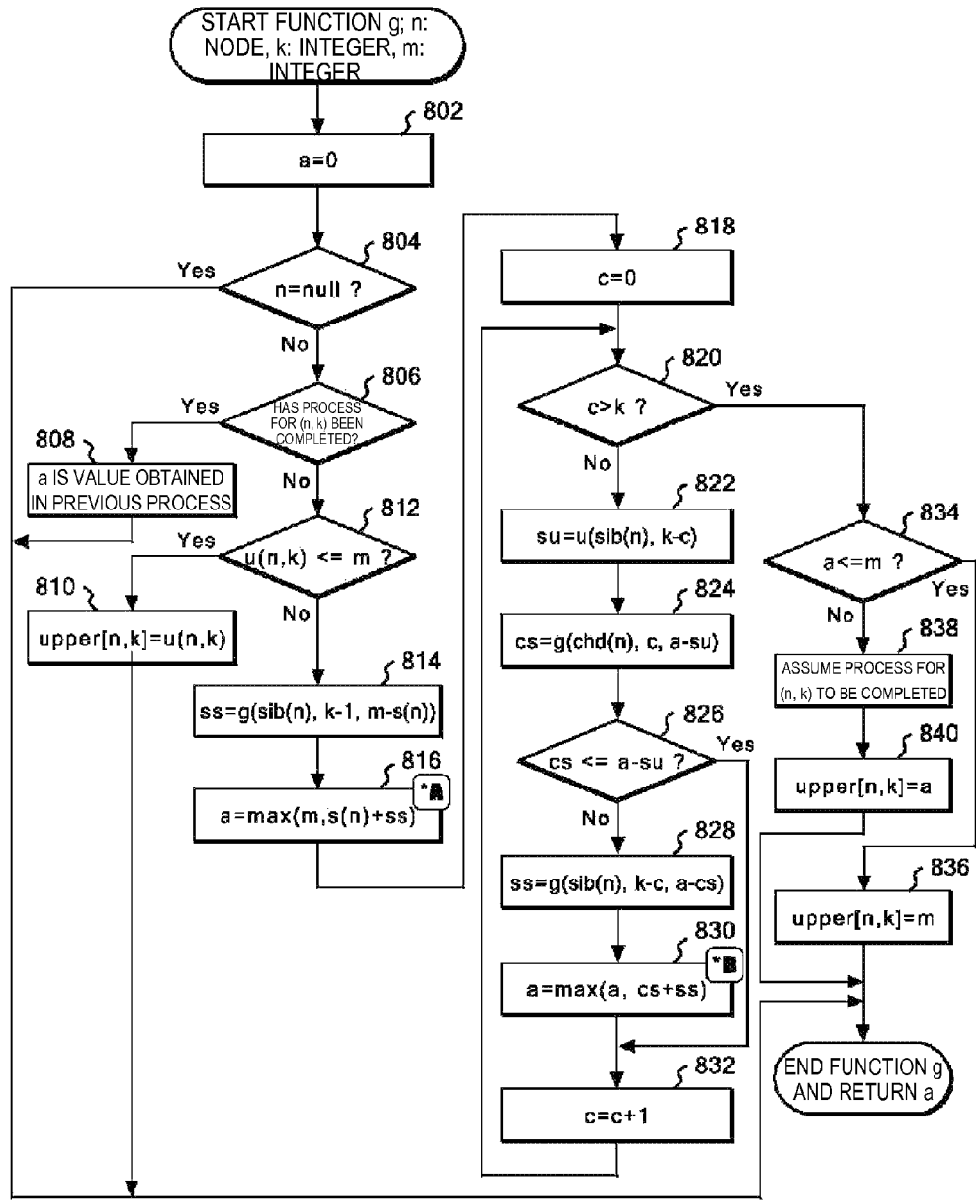
FIG. 8 illustrates a flowchart of a search process using dynamic programming with pruning according to an embodiment of the present invention.
Figure 9:
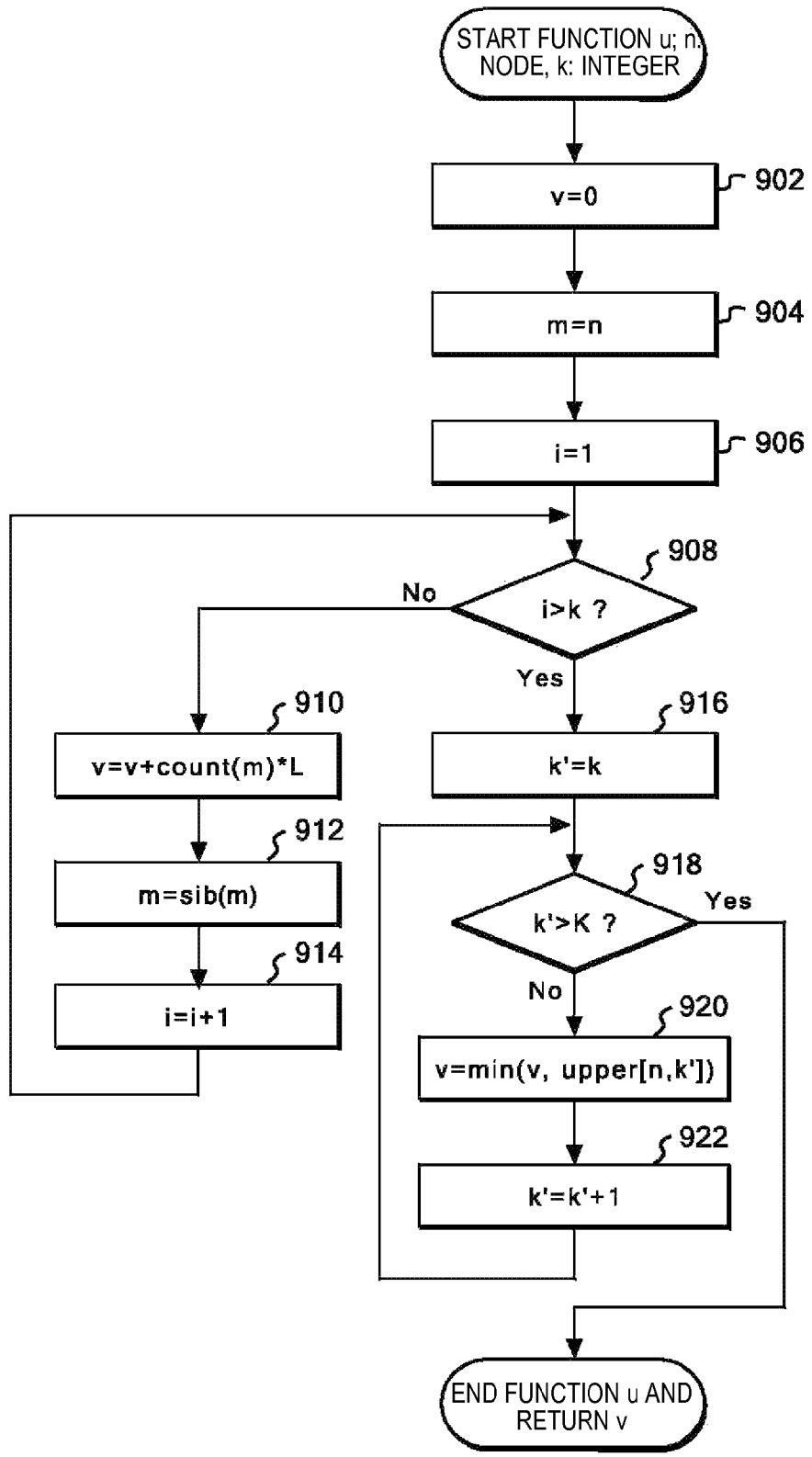
FIG. 9 illustrates a flowchart of a search process using dynamic programming with pruning according to an embodiment of the present invention.

In FIG. 8, if "n" is not null, the process proceeds to step 806, where determination is made as to whether the process has been performed for (n, k). If the process has been performed for (n, k), the value obtained for (n, k) in the previous process is used as "a" and the function g( ) returns "a" at step 808 and then ends.

On the other hand, if the process has not been performed for (n, k), determination is made at step 812 as to whether u(n, k)≤m. If so, upper[n, k]=u(n, k) is set at step 810. Then the function g( ) returns "a" and ends. Here, upper[u, k] is the upper limit of the function f(n, k) described with respect to FIG. 7, and is a two-dimensional array in which each element is initialized to a value which is assumed to be ∞ by the system. Additionally, u(n, k) is an appropriate function, where u(n, k)≥f(n,k), an example of which will be described later with reference to the flowchart of FIG. 9. If it is determined at step 812 that u(n, k) is greater than m, g( ) is recursively called by ss=g(sib(n), k−1, m−s(n)) and its return value is substituted for "ss" at step 814. Here, sib(n) is the next sibling node of "n" and s(n) is the area covered by node "n", as described earlier.

At step 816, a=max(m, s(n)+ss) is calculated and the calculated value is substituted for "a". The value is temporarily stored as *A.

At step 818, c=0 is set. Then, the sequence from step 820 to 832 is repeated until "c" exceeds k (c>k).

Specifically, at step 822, a value calculated by su=u (sib(n), k−c) is substituted for "su". At step 824, g(f) is recursively called by cs=g(chd(n), c, a−su) and the calculated value is substituted for "cs".

At step 826, determination is made as to whether cs≤a−su. If not, the process proceeds to step 828, where a value calculated by ss=g(sib(b), k−c, a−cs) is substituted for "ss". At step 830, a value calculated by a=max(a, cs+ss) is substituted for "a". The value is temporarily stored as *B. Then, "c" is incremented as c=c+1 at step 832 and then the process returns to step 820.

If it is determined at step 826 that cs≤a−su, the process directly proceeds to step 832, where "c" is incremented as c=c+1, then the process returns to step 820.

If it is determined at step 820 that c>k, determination is made at step 834 as to whether a≤m. If so, upper[n, k]=m is set at step 836 and then the function g( ) returns "a" and ends.

If it is determined at step 834 that a≤m, then (n, k) is assumed to be estimated and upper[n, k]=a is set at step 840. Then the function g( ) returns "a" and ends.

A process of the function u(n, k) called from the function g( ) will be described with reference to the flowchart of FIG. 9. At step 902, a variable v=0 is set at step 902, a variable m=n is set at step 904, and a variable i=1 is set at step 906.

Determination is made at step 908 as to whether i>k. If not, a value calculated by v=v+count(m)*L is substituted for "v" at step 910. Here, "L" is the maximum string length and count(m) is the number of occurrences of "m". Then "m" is replaced with the next sibling node by m=sib(m) at step 912. Then "i" is incremented as i=i+1 at step 914 and the process returns to step 908.

If it is determined at step 908 that i>k, the process proceeds to step 916, where k' is substituted for "k", then determination is made at step 918 as to whether k'>K. Here, "K" is the maximum number of character strings that are selected.

If it is determined at step 918 that k' is not greater than "K", a value calculated by v=min(v, upper[n, k']) is substituted for "v" at step 920. Then, k' is incremented as k'=k'+1 and the process returns to step 918.

Step 920 and step 922 are thus repeated and, when it is determined at step 918 that k'>K, the function u( ) returns "v" and ends.

The function u(n, k) is a function that returns a value greater than or equal to the upper limit of the function f(n, k), that is, the condition u(n, k)≥f(n, k) always holds. Whenever the condition is satisfied, the algorithm of the present invention properly works. The smaller the value u(n, k)−f(n, k), the more efficiently the pruning works. That is, the smaller the value of "u", the better, as long as the value of "u" satisfies the condition. The pruning is most effective when the value of "u" is equal to the true maximum value f(n, k).

upper[n, k] retains a previously calculated upper limit. The initial value of upper[n, k] is ∞ as described above, which means that the condition upper[n, k]≥f(n, k) always holds. That is, "u" is designed using the upper.

Since "k" is the number of lines that are selected, the value of f(n, k) increases as "k" increases. Accordingly, if k<k', then f(n, k)<f(n, k'). Therefore, f(n, k)<f(n, k') upper[n, k']. That is, upper[n, k'] satisfies the condition of the upper limit of f(n, k). Since the maximum value that "k" can take is "K", the smallest upper[n, k'] among the values of k' between "k" and "K", inclusive, is used as the output of the function u(n, k).

One may think that upper[n, k] will be the smallest. However, it is possible that the upper limit is calculated for a larger value of "k" first because of the order of calculation. The result of the calculation is reused.

Figure 10:
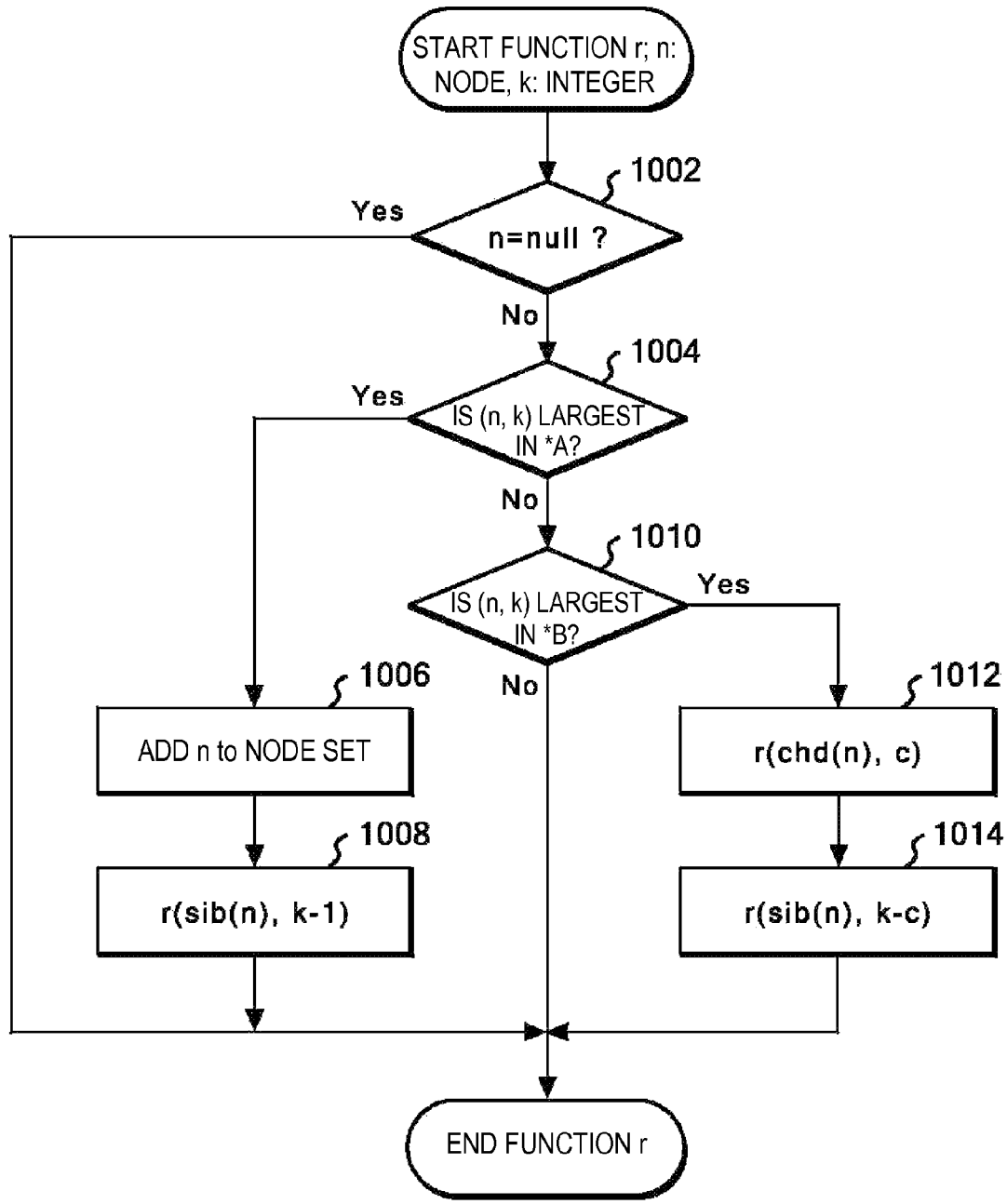
FIG. 10 illustrates a flowchart of a process for reconstructing a maximum area node set according to an embodiment of the present invention.

Referring to the flowchart of FIG. 10, a process of the function "r" will be described below. The process is the step of using the function "r" to reconstruct the node that returned the maximum value for (n, k) in the flowchart of FIG. 6. The arguments of the function "r" are node "n" and integer "k".

At step 1002, determination is made as to whether n=null. If so, the function "r" immediately ends.

At step 1004, determination is made as to whether (n, k) is the largest in *A. If the function f(n, k) in FIG. 7 was used in the dynamic programming, the determination means that the result of calculation at step 712 and the result of the calculation at step 722 were compared and the maximum value was calculated from the result of the calculation at step 712. If the function g(n, k, m) in FIG. 8 was used in the dynamic programming with pruning, the determination means that the result of the calculation at step 816 and the result of calculation at step 830 were compared and the maximum value was calculated from the result of the calculation at step 816.

If it is determined at step 1004 that (n, k) is the largest in *A, "n" is added to the node set at step 1006 and r( ) is recursively called by r(sib(n), k−1) at step 1008 and then the function r ends.

If it is determined at step 1004 that (n, k) is not the largest in *A, the process proceeds to step 1010, where determination is made as to whether or not (n, k) is the largest in *B. If the function f(n, k) in FIG. 7 was used in the dynamic programming, the determination means that the result of the calculation at step 712 and the result of the calculation at step 722 were compared and the maximum value was calculated from the result of the calculation at step 722. If the function g(n, k, m) in FIG. 8 was used in the dynamic programming with pruning, the determination means that the result of the calculation at step S816 and the result of the calculation at step 830 were compared and the maxim value was calculated from the result of the calculation at step 830.

If it is determined at step 1010 that (n, k) is the largest in *B, r(chd(n), c) is recursively called at step 1012 and r( ) is recursively called by r(sib(n), k−c) at step 1014, then the function "r" ends. Here, "c" is the value initialized at step 714 of the flowchart in FIG. 7 to then yield the maximum value of a at step 722 or the value initialized at step 818 of the flowchart in FIG. 8 to then yield the maximum value of a at step 830.

If it is determined at step 1010 that (n, k) is not the largest in *B, the function "r" immediately ends. The nodes reconstructed in this way are provided to the GUI module 210 and displayed on the display 114 at step 612 in FIG. 6.

Figure 11:
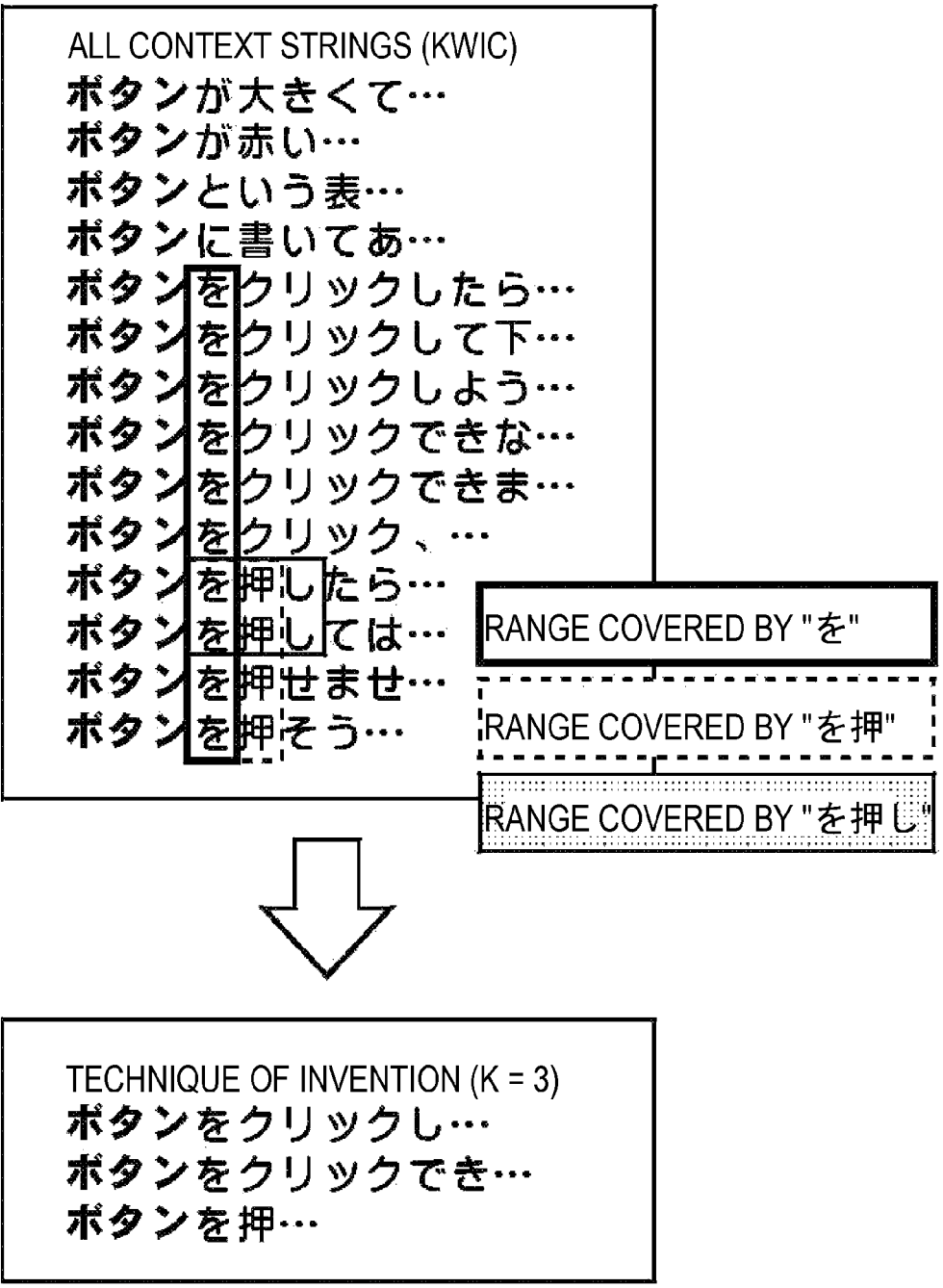
FIG. 11 is a diagram illustrating an example of irreversible compression display of KWIC.

FIG. 11 illustrates an example of display of the KWIC sample given in the "Background of the Invention" section that is compressed in an extremely small area of K=3 according to the technique of the present invention. It can be seen that even though K=3, a good compilation of the KWIC sample, which is represented by phrases "ボタンをクリックし… ", "ボタンをクリックでき ", and "ボタンを押… ", is provided.

FIG. 12 illustrates comparison between the result of a search using a query, "データベース", according to a typical conventional technique described in the "Background of the Invention" section and the result of search using the same query according to the technique of the present invention. The maximum length L of suffix strings is set to 10 (L=10) and k (=10) frequently-occurring strings are displayed in the example. The numbers such as "22:" displayed indicate the frequencies of occurrences.

The technique of the present invention collectively counts strings like "データベース・サーバーを起動 " (activates the database server) and "データベース・サーバーが停止する " (the database server is shut down) as the string "データベースサーバー " (database server). Therefore, context strings that frequently occurred can be readily identified. In the conventional technique, in contrast, the total numbers of occurrences of frequently-occurring words are smaller because some of them are not counted. In the worst case, frequently-occurring context strings cannot be found.

In an experiment conducted using approximately 20 MB of data, especially the embodiment that uses the dynamic programming with pruning has achieved a maximum search speed 20 times faster than dynamic programming without pruning.

Furthermore, building a frequency-ordered suffix tree beforehand improves the efficiency of searching as compared with building a frequency-ordered context tree after searching using an N-gram index. Therefore, the technique of the present invention can be applied to large-sized data.

The present invention can be advantageously used for ensuring the consistency of wording or for searching for word usage examples in manuals and business documents.

Some existing text mining programs use algorithms that display the top K frequently-occurring words. Such algorithms have a problem in that their word-wise retrieval does not necessarily align with users' interests. The present invention enables the top K variable-length strings that appropriately represent certain context to be displayed. Therefore, the present invention is also applicable to text mining programs.

While a frequency-ordered prefix tree has been built in the embodiment described above, a suffix tree can also be built by reversing a document. In that case, preceding context strings can be brought together. For example, strings like "mail server", "NFS server" and "Web server" can be returned to a query, "server".

A specific process includes building a frequency-ordered suffix tree with the document reversed, reversing a query string, searching a context set that provides the maximum area, and displaying results of the search reversely.

While the present invention has been described with reference to what are presently considered to be the preferred embodiments, it is to be understood that the invention is not limited, to the disclosed embodiments. On the contrary, the invention is intended to cover various modifications and equivalent arrangements included within the spirit and scope of the appended claims. For example, it should be understood that the present invention can be carried out in any computer hardware and platform. It will be apparent to those skilled in the art that the present invention is also applicable to any language in addition to Japanese and English. The scope of the following claims is to be accorded the broadcast interpretation so as to encompass all such modifications and equivalent structures and functions.

That which is claimed:

1. A computer implemented method for generating search results to be displayed, the method comprising the steps of:
   retrieving a document to be searched;
   generating a frequency ordered suffix tree from the retrieved document, wherein the frequency ordered suffix tree is a list of each possible string of the document arranged according to a frequency of use of each possible string within the document;
   searching the frequency ordered suffix tree on the basis of a keyword to retrieve a set context strings, wherein the set of context strings includes all of the each possible strings of the frequency ordered suffix tree beginning with the keyword, the retrieved set of context strings being a frequency ordered context tree as the context strings thereof are arranged according to frequency of use of the each possible string within the document;
   compressing the retrieved set of context strings of the frequency ordered context tree to optimize the frequency ordered context tree for display within a limited display region capable of displaying a limited number of context strings, the compressing including obtaining one or more context strings of the frequency ordered context tree to maximize a sum of areas under the condition that only a predetermined maximum number of context strings are displayed within the limited display region, wherein each area is defined as the frequency of use of a given context string within the document multiplied by a length of the context string; and
   displaying the compressed context strings of the frequency ordered context tree within the limited display region;

wherein the steps of retrieving, generating, searching, compressing, and displaying are performed using one or more computer systems.

2. The method according to claim 1, wherein the step of compressing the context strings is based on dynamic programming.

3. The method according to claim 2, wherein the dynamic programming is dynamic programming on the frequency-ordered context tree data obtained from a result of a search of the frequency-ordered suffix tree.

4. The method according to claim 3, wherein the dynamic programming comprises a pruning process in which a maximum value is provided in a search in progress on the frequency-ordered context tree data and, if an upper limit does not reach the maximum value, the search in progress is abandoned.

5. The method according to claim 1, wherein the limited display region can only display a predetermined maximum number of context strings based on a number of lines in the limited display region.

6. The method according to claim 5, wherein the number of the obtained one or more context strings does not exceed the length of the one or more predetermined maximum number of context strings.

7. The method according to claim 5, wherein the number of the obtained one or more context strings does not exceed a number of characters in the limited display region.

8. A non-transitory program storage medium tangibly embodying computer readable instructions which, when implemented, causes a computer to generate search results to be displayed, by carrying out the steps of a method comprising:
   retrieving a document to be searched;
   generating a frequency ordered suffix tree from the retrieved document, wherein the frequency ordered suffix tree is a list of each possible string of the document arranged according to a frequency of use of each possible string within the document;
   searching the frequency ordered suffix tree on the basis of a keyword to retrieve a set of context strings, wherein the set of context strings includes all of the each possible strings of the frequency ordered suffix tree beginning with the keyword, the retrieved set of context strings being a frequency ordered context tree as the context strings thereof are arranged according to frequency of use of the each possible string within the document;
   compressing the retrieved set of context strings of the frequency ordered context tree to optimize the frequency ordered context tree for display within a limited display region capable of displaying a limited number of context strings, the compressing including obtaining one or more context strings of the frequency ordered context tree to maximize a sum of areas under the condition that only a predetermined maximum number of context strings are displayed within the limited display region, wherein each area is defined as the frequency of use of a given context string within the document multiplied by a length of the context string; and
   displaying the compressed context strings of the frequency ordered context tree within the limited display region.

9. The program storage medium according to claim 8, wherein the step of compressing the context strings is based on dynamic programming.

10. The program storage medium according to claim 9, wherein the dynamic programming is dynamic programming on the frequency-ordered context tree data obtained from a result of a search of the frequency-ordered suffix tree.

11. The program storage medium according to claim 10, wherein the dynamic programming comprises a pruning process in which a maximum value is provided in a search in progress on the frequency-ordered context tree data and, if an upper limit does not reach the maximum value, the search in progress is abandoned.

12. The program storage medium according to claim 8, wherein the limited display region can only display a predetermined maximum number of context strings based on a number of lines in the limited display region.

13. The program storage medium according to claim 12, wherein the number of the obtained one or more context strings does not exceed the length of the one or more predetermined maximum number of context strings.

14. The program storage medium according to claim 12, wherein the number of the obtained one or more context strings does not exceed a number of characters in the limited display region.

15. A character string generation system including a processor and a memory for generating a character string to be displayed, the system comprising:

a retrieving unit retrieving a document to be searched;

a generating unit generating a frequency ordered suffix tree from the retrieved document, wherein the frequency ordered suffix tree is a list of each possible string of the document arranged according to a frequency of use of each possible string within the document;

a searching unit searching the frequency ordered suffix tree on the basis of a keyword to retrieve a set context strings, wherein the set of context strings includes all of the each possible strings of the frequency ordered suffix tree beginning with the keyword, the retrieved set of context strings being a frequency ordered context tree as the context strings thereof are arranged according to frequency of use of the each possible string within the document;

a compressing unit compressing the retrieved set of context strings of the frequency ordered context tree to optimize the frequency ordered context tree for display within a limited display region of a display device capable of displaying a limited number of context strings, the compressing including obtaining one or more context strings of the frequency ordered context tree to maximize a sum of areas under the condition that only a predetermined maximum number of context strings are displayed within the limited display region, wherein each area is defined as the frequency of use of a given context string multiplied by within the document multiplied by a length of the context string; and the display device displaying the compressed context strings of the frequency ordered context tree within the limited display region thereof.

16. The system according to claim 15, wherein the compressing unit includes dynamic programming.

17. The system according to claim 16, wherein the dynamic programming is dynamic programming on the frequency-ordered context tree data obtained from a result of a search of the frequency-ordered suffix tree.

18. The system according to claim 17, wherein the dynamic programming comprises a pruning process in which a maximum value is provided in a search in progress on the frequency-ordered context tree data and, if an upper limit does not reach the maximum value, the search in progress is abandoned.

19. The system according to claim 15, wherein the limited display region can only display a predetermined maximum number of context strings based on a number of lines in the limited display region.

20. The system according to claim 15, wherein the number of the obtained one or more context strings does not exceed the length of the one or more predetermined maximum number of context strings, and wherein the number of the obtained one or more context strings does not exceed a number of characters in the limited display region.

* * * * *